(12) United States Patent
Perreault (10) Patent No.: US 7,652,828 B2
(45) Date of Patent: Jan. 26, 2010

(54) ZOOM LENS ASSEMBLY CONTROLLED BY SHAPE MEMORY MATERIAL

(75) Inventor: Daniel C. Perreault, Everett, WA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 11/968,404

(22) Filed: Jan. 2, 2008

(65) Prior Publication Data

US 2009/0168198 A1    Jul. 2, 2009

(51) Int. Cl.
*G02B 15/14*    (2006.01)
*G02B 7/02*     (2006.01)

(52) U.S. Cl. ...................................... 359/694; 359/824

(58) Field of Classification Search ................. 359/694, 359/819, 821–824, 811, 813
See application file for complete search history.

(56) References Cited

U.S. PATENT DOCUMENTS

2007/0058070 A1* 3/2007 Chen ........................... 348/340
2008/0302024 A1* 12/2008 Browne et al. .................... 52/1

* cited by examiner

*Primary Examiner*—Scott J Sugarman
*Assistant Examiner*—Dawayne A Pinkney
(74) *Attorney, Agent, or Firm*—Perkins Coie LLP (57) ABSTRACT

A zoom lens assembly comprises a first optical component, a second optical component, and an actuator. The actuator comprises a shape memory material that changes its shape in response to electrical or thermal fields to change the distance between the first and second optical components.

16 Claims, 9 Drawing Sheets

ZOOM LENS ASSEMBLY CONTROLLED BY SHAPE MEMORY MATERIAL

BACKGROUND

A zoom lens assembly comprises a collection of optical components that can be moved relative to each other in order to vary the effective focal length and field of view of the assembly. For example, a simple zoom lens assembly may comprise a pair of lenses (or lens groups) that can be moved apart along a common optical axis to increase the assembly's focal length while decreasing its field of view ("zoom in"), and brought closer together along the axis to decrease the assembly's focal length while increasing its field of view ("zoom out").

Zoom lens assemblies can be found in a wide variety of optical instruments, including, for example, cameras, barcode scanners, binoculars, telescopes, microscopes, and projectors, to name but a few. In addition, the number, type, and spacing of lenses in a zoom lens assembly can vary widely across different applications. For instance, different optical applications may use diverging and/or converging lenses, magnification lenses, focus correction lenses, and so on. Moreover, the lenses in a zoom lens assembly may be combined with a variety of other optical components such as optical filters, mirrors, and so on, depending on the application in which the zoom lens assembly is used.

Figure 1A:
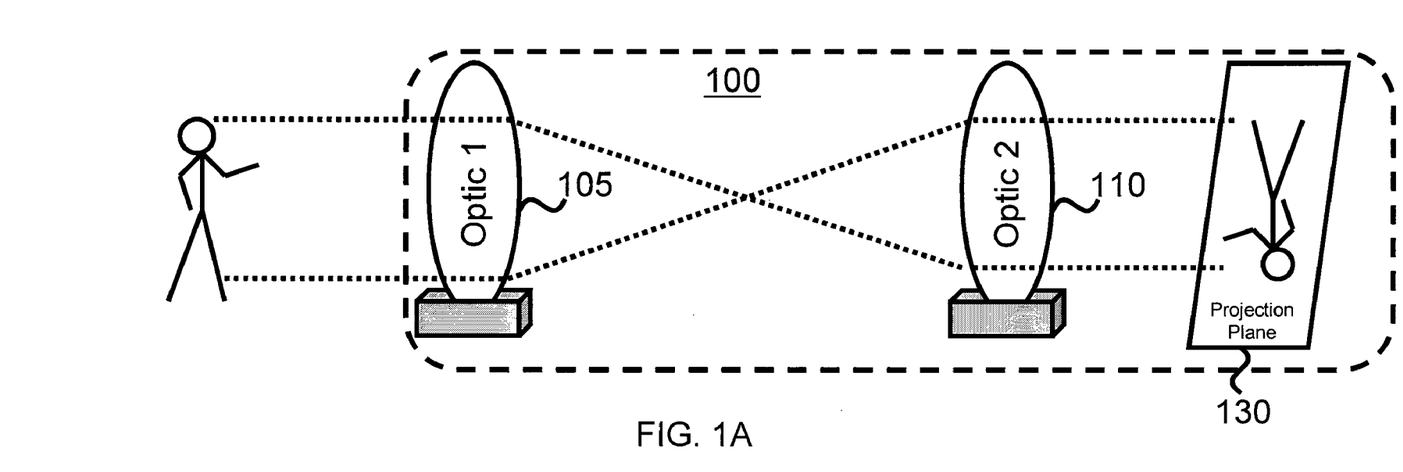
FIGS. 1A and 1B illustrate a simple zoom lens assembly configuration used by a camera.
Figure 1B:
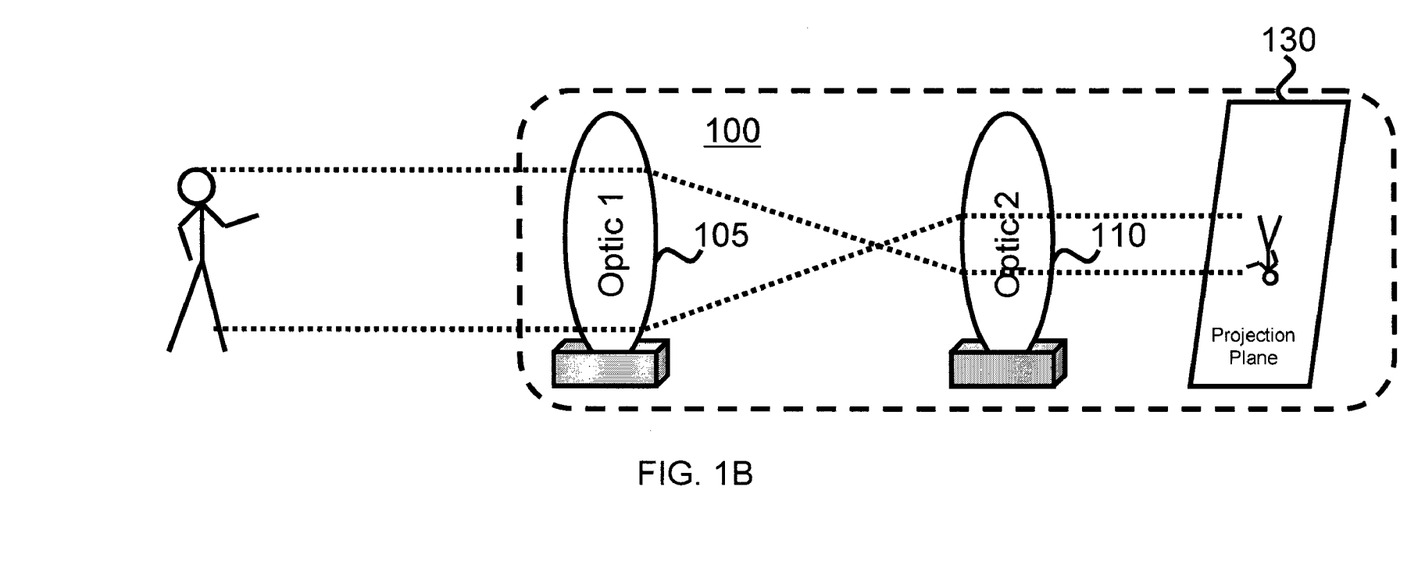

As an example, FIGS. 1A and 1B show a simple zoom lens assembly used in a camera 100. In camera 100, as a first optic 105 moves relative to a second optic 110, the zoom lens assembly "zooms out" or "zooms in" to shrink or enlarge the projection of an image onto a projection plane 130 such as film or a CCD or CMOS image sensor.

In most conventional zoom lens assemblies, lenses and other optical components are moved under the control of a collection of mechanical components such as motors, switches, solenoids, and/or other actuators (not shown in FIGS. 1A and 1B). Accordingly, the performance and reliability of these assemblies tends to be affected by the performance and reliability of the mechanical components. For instance, the speed and precision with which a zoom lens assembly can zoom in and out is generally determined by the response-time and accuracy of the mechanical components. Similarly, the lifetime of a zoom lens assembly may be tied to the lifetime of the mechanical components.

Unfortunately, conventional mechanical components tend to suffer from a variety of shortcomings that can limit both the performance and reliability of zoom lens assemblies. For instance, motors used to move the lenses may experience some form of gear lash and/or hysteresis, which may affect the accuracy of their movement. In addition, many of the mechanical components may fail much more readily than corresponding optical components, thus limiting the expected lifetime of the zoom lens assemblies according to the failure characteristics of the mechanical components. Further, mechanical components may limit the degree to which the zoom lens assemblies can be miniaturized. For instance, while it may be possible to develop tiny lenses for miniature zoom lens assemblies, it may not be feasible to create commensurately tiny motors and other actuators for moving the lenses. Accordingly, conventional zoom lens assemblies may not be able to fit within small electronic devices such as miniature cell-phone cameras and bar code scanners. Finally, mechanical actuator components such as motors typically consume a relatively large amount of power compared with other components of a zoom lens assembly. Accordingly, the power consumption of the mechanical actuators may not be acceptable for portable devices where power is scarce, such as the cell-phone cameras and portable bar code scanners.

In an attempt to address at least some of the above shortcomings of conventional zoom lens assemblies, researchers have sought new techniques for moving the lenses and other optical components of a zoom lens assembly. One such technique involves the use of a shape memory alloy that expands and contracts when heated and cooled to move one of two lens groups within a zoom lens assembly. An example of a camera using this technique is disclosed in U.S. Patent Application Publication No. 2007/0058070 to Chen (hereafter, "Chen").

Like the conventional mechanical components described above, the shape memory alloys used in zoom lens assemblies such as that illustrated in Chen also suffer from a variety of shortcomings. For instance, the amount of displacement provided by these shape memory alloys is relatively small compared to their overall size. In particular, conventional shape memory alloys such as those described in Chen can typically be expanded by around 10% of their original size when heated. Accordingly, in order to achieve even a relatively small amount of lens displacement (e.g., 0.5 cm), Chen requires a zoom lens assembly to include a relatively long unit of shape memory alloy (e.g., 5 cm). Additionally, the heating and cooling of the shape memory alloy can be a relatively slow and power consuming process. Finally, the shape memory alloys in Chen tend to exhibit hysteresis characteristics that may limit the precision with which they may displace the lenses in a zoom lens assembly.

The need exists for techniques and technologies that overcome some or all of the above problems, as well as ones that provide additional benefits. Overall, the examples herein of some prior or related technologies and their associated limitations are intended to be illustrative and not exclusive. Other limitations of existing or prior technologies will become apparent to those of skill in the art upon reading the following Detailed Description.

DETAILED DESCRIPTION

Various examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

This disclosure presents techniques and technologies that can be used to control the movement of various optical components in a zoom lens assembly. For clarity and simplicity of explanation, many examples presented in this disclosure relate to zoom lens assemblies having a relatively simple lens configuration. In particular, several of the example zoom lens assemblies include a pair of lenses physically coupled to each other via an actuator structure formed by a shape memory material. Although these examples are relatively simple, it should be understood that embodiments of the invention may include different and/or more complex lens configurations controlled by shape memory materials. In addition, embodiments of the invention may include additional optical, mechanical, and/or electrical components not specifically shown or included in the examples of this disclosure.

As used in this disclosure, the term "shape memory material" denotes any of several materials exhibiting two or more stable, solid form configurations defined in relation to martensitic transformations of the materials. Examples of shape memory materials include shape memory alloys such as nickel-titanium (Ni—Ti), gold-cadmium (Au—Cd), copper-zinc-alumninum-nickel (Cu—Zi—Al—Ni), and copper-alumninum-nickel (Cu—Al—Ni), and shape memory ceramics such as lead zirconate ($PbZrO_3$), lead titanate ($PbZrO_3$), and lead zirconate titanate (PZT). A variety of shape memory materials and their properties are described in detail in a book entitled "Shape Memory Materials", Cambridge University Press, 1998, Edited by K. Otsuka, and C. M. Wayman (hereafter, "Otsuka"). The book also describes various techniques for forming the shape memory materials in different shapes.

A shape memory material changes configuration by realigning its crystalline structure into a different pattern. Typically, each pattern defines a different shape of the material, and therefore a shape memory material can be cycled between different shapes by changing the pattern of its crystalline structure. In a shape memory alloy, the crystalline structure can be changed by controlling the alloy's temperature or by applying physical stress to the alloy. On the other hand, in a shape memory ceramic, the crystalline structure can be changed by applying an electrical field to the ceramic.

In general, the different configurations of a shape memory material can be initially established through a "training" process designed to teach the material to "remember" different configurations. In one example, this training process involves placing the material in desired shapes while at extreme temperatures to establish the different configurations. A variety of such training processes are disclosed in detail in Otsuka, and still other training processes are known in the art.

Shape memory alloys and shape memory ceramics each have various advantages and drawbacks compared with the other. For instance, shape memory alloys tend to be more flexible and exhibit larger changes of shape compared with shape memory ceramics. However, shape memory alloys generally exhibit greater hysteresis and change shape more slowly compared with shape memory ceramics. Additionally, shape memory alloys typically require sustained input energy to maintain particular configurations due to their sensitivity to changes in temperature and physical stress, while shape memory ceramics do not require sustained input energy, since different configurations can be maintained without continued application of an electrical field.

Shape memory alloys and shape memory ceramics can both be controlled to change shape using electricity. In particular, a shape memory alloy can be heated to change its shape by passing an electrical current through the alloy. Likewise, a shape memory ceramic can be controlled to change its shape by passing an electrical current through the ceramic. On the other hand, shape memory alloys can also be controlled to change shape using non-electrical heating and/or cooling techniques.

To illustrate the electrical control of shape memory alloys and ceramics, some of the drawings show a simple electrical control system modeled as a switch "S" that can be actuated to form a current path between a power source VDD and ground through a shape memory material and a resistor "R". When the switch is closed, current flows through the shape memory material. In the case of the shape memory alloy, this current causes the alloy to heat up and change its shape, and in the case of the shape memory ceramic, the current generates an electrical field to cause the ceramic to change its shape. While some of the drawings in this disclosure do not show this simple electrical control system, each of the illustrated zoom lens assemblies could use a similar electrical control system or any of several alternatives.

Although the drawings illustrate a relatively simple electrical control system, it should be recognized that a variety of different electrical control systems could be used to change the shape of the illustrated shape memory materials. In addition, it should be recognized that shape memory alloys can be heated and cooled by means other than electricity. However, because the emphasis of this disclosure is not on control systems, a detailed presentation of alternative control systems will be omitted for brevity and simplicity of explanation.

Additionally, although the drawings illustrate optical components that move relative to each other solely by translational motion, i.e., by changing the distance between one another, in other embodiments, optical components may be controlled to undergo other types of relative displacement such as rotational movement. Example optical applications where rotational movement may be used include apparatuses where optical filters are "tuned" by rotation.

As described above, Chen discloses a conventional zoom lens assembly that uses an actuator comprising a shape memory alloy. In the zoom lens assembly of Chen, the actuators move components using a simple expansion property of the shape memory alloy. In contrast to the conventional zoom lens assemblies disclosed in Chen, the example zoom lens assemblies in this disclosure include actuators comprising shape memory materials adapted to displace optical components through geometric deformations rather than relying on expansion and contraction alone.

By relying on these geometric deformations rather than on expansion and contraction alone, many of the disclosed actuators are able to displace optics by greater distances compared with the actuators in Chen, but within a similarly sized space. This can be true whether the disclosed actuators are formed of the same material as the actuators in Chen, or whether the actuators are formed of other materials such as shape memory ceramics. Additionally, because shape memory ceramics typically have less expansion compared with shape memory alloys, the mere expansion of a shape memory ceramic will not provide useful displacement most zoom lens assembly components.

In sum, unlike the actuators of Chen, the disclosed actuators are designed to displace the optical components by distances greater than the mere 10% achieved by Chen. Also unlike the conventional zoom lens assemblies of Chen, the example zoom lens assemblies in this disclosure can be implemented using shape memory ceramics instead of shape memory alloys. In Chen, it would be impractical to substitute shape memory alloy actuators with shape memory ceramic actuators because shape memory ceramics expand so little that they cannot provide an acceptable amount of lens displacement with Chen's simple geometry. Accordingly, example zoom lens assemblies that use shape memory ceramics can achieve lower power consumption, superior response time, more accurate displacement, and virtually no hysteresis compared with conventional zoom lens assemblies.

Figure 2A:
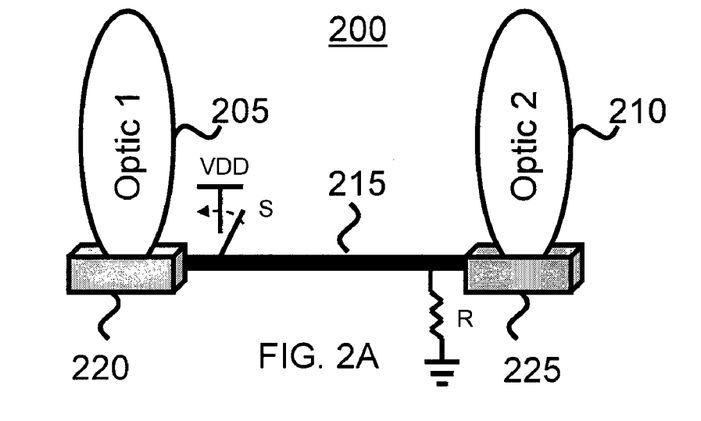
FIGS. 2A through 2D illustrate a zoom lens assembly controlled by an actuator comprising a shape memory material having a straight configuration and a bent configuration.
Figure 2B:
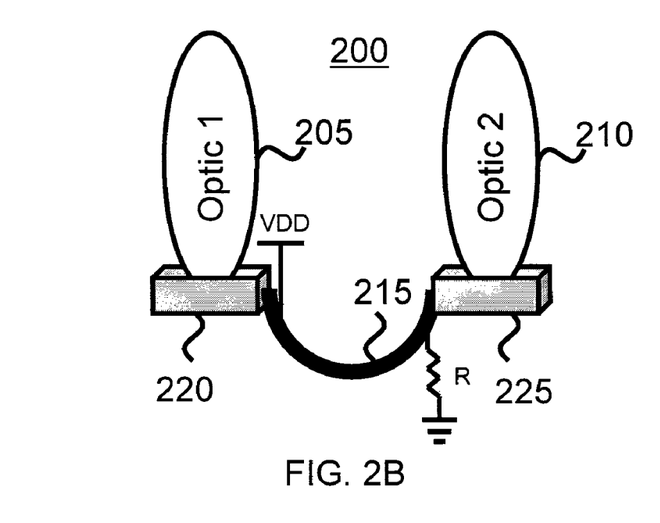

FIGS. 2A and 2B illustrate an example zoom lens assembly 200 controlled by an actuator 215 comprising a shape memory material having a straight configuration and a bent configuration. When the shape memory material is in the straight configuration illustrated in FIG. 2A, the effective focal length of zoom lens assembly 200 is relatively large, and when the shape memory material is in the bent configuration, the effective focal length of zoom lens assembly 200 is relatively small.

Referring to FIGS. 2A and 2B, zoom lens assembly 200 comprises a first optic 205 and a second optic 210. First and second optics 205 and 210 each typically comprises a transparent lens. Although not specifically shown, these and other optics shown in FIGS. 2-9 may reside in an optical instrument such as a camera, bar-code scanner, binoculars, telescope, microscope, projector, etc.

First optic 205 is connected to a mount 220 and second optic 210 is connected to a mount 225. Mounts 220 and 225 are connected to actuator 215 to facilitate movement of optics 205 and 220 in response to changes in the configuration of actuator 215. Although not shown in the drawings, the mounts and the corresponding optics may be attached to tracks, grooves, or other guide mechanisms to accurately control the movement of the optics. In addition, although not shown in the drawings, optics 205 and 210 may be attached to actuator 215 through an alternative apparatus or mechanism other than the illustrated mounts.

Actuator 215 typically comprises a shape memory alloy or a shape memory ceramic. Actuator 215 may be formed entirely of a single shape memory alloy or ceramic, or it may contain additional elements or features. For instance, in this and other examples, actuators may be formed by combining a shape memory ceramic with a flexible material in a layered structure to increase the amount of deformation that can be achieved by the shape memory ceramic. The layered structure, also referred to as a bi-morph structure or a stacked structure, typically comprises thin layers of shape memory ceramic interspersed with layers of a flexible material such as a plastic polymer. The thin layers of shape memory ceramic are generally less brittle than thicker layers of shape memory ceramic, and therefore the layered structure can move in a more dynamic way than a thicker, non-layered shape memory ceramic. As another alternative, a shape memory material could be formed in a mesh or other configuration, either with or without additional elements such as stacked layers.

Figure 7:
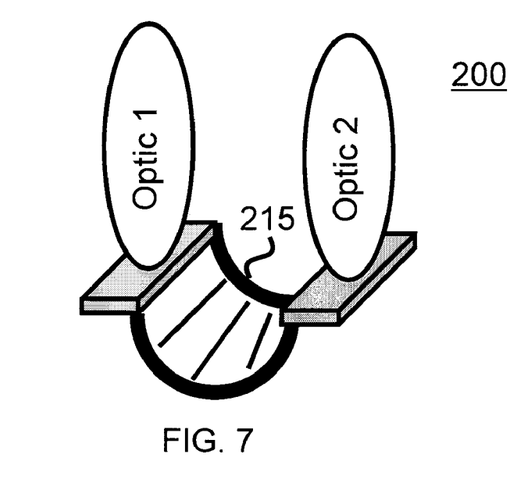
FIG. 7 illustrates a variation of the zoom lens assembly shown in FIGS. 2A and 2B where an actuator is formed by a three-dimensional sheet.
Figure 8:
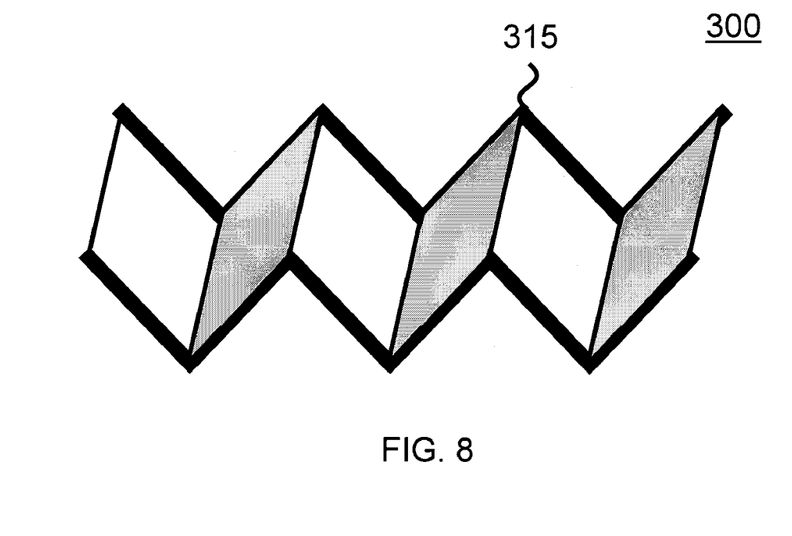
FIG. 8 illustrates a variation of the zoom lens assembly shown in FIGS. 3A and 3B where an actuator is formed by a three dimensional sheet.

Although shown as a rod-like structure in FIGS. 2A and 2B, actuator 215 can take other forms such as a deformable three-dimensional sheet as illustrated in FIG. 7. Similarly, other actuators presented in this disclosure can be modified to form various three-dimensional structures. For example, an actuator 315 shown as a rod-like structure in FIGS. 3A and 3B can be modified to form a deformable sheet as illustrated in FIG. 8.

In the example of FIGS. 2A and 2B, actuator 215 is controlled by a simple electrical circuit comprising a power source VDD, a resistor "R", and a switch "S" connected in series through the shape memory material. When switch "S" is closed, current flows through the shape memory material. In a shape memory alloy, this current can be used to heat the material to change its shape, and in a shape memory ceramic, the current can be used to apply an electrical field to the material to change its shape. In a shape memory alloy, a relatively persistent current must be applied during one of the shape configurations in order to maintain an appropriate temperature for the configuration. Accordingly, switch "S" may remain closed during one of the configurations when actuator 215 comprises a shape memory alloy. On the other hand, when actuator 215 comprises a shape memory ceramic, each configuration can be stably maintained without applying a persistent electrical field, and therefore switch "S" can be opened once actuator 215 changes configurations.

Figure 2C:
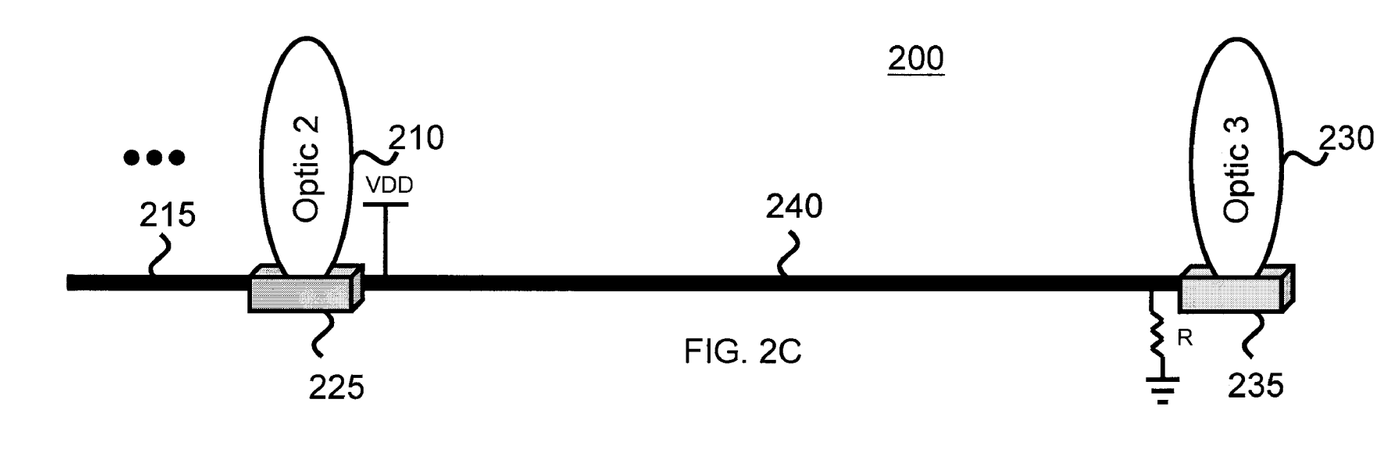
Figure 2D:
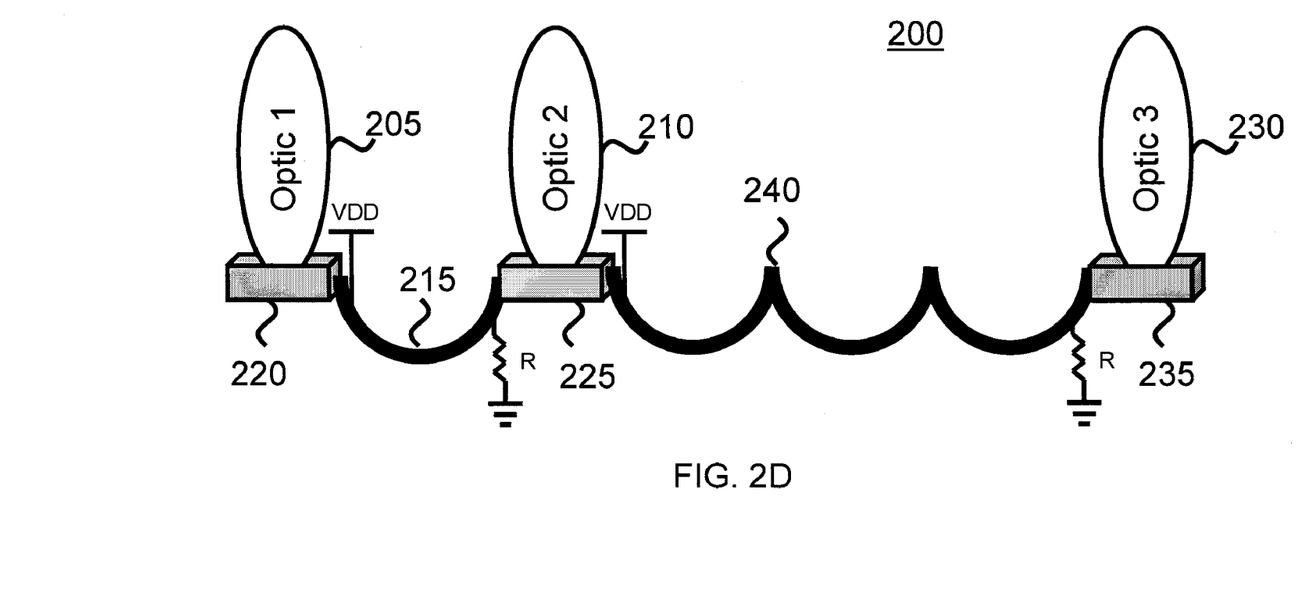

As illustrated by FIGS. 2A and 2B, actuator 215 is attached to mounts 220 and 225 such that when actuator 215 changes from the straight configuration to the bent configuration, first and second optics 205 and 210 are pulled closer together. As illustrated by FIGS. 2C and 2D, greater range of movement can be achieved by ganging together several units of shape memory material to form a longer actuator 240. Also illustrated in FIGS. 2C and 2D, zoom lens assembly 200 may include additional optical components such as a third optic 230 and a corresponding mount 235. Such additional optical components can be moved independent from or in concert with other optical components such as first and second optics 205 and 210.

Additionally, in the examples of FIGS. 2C and 2D, individual units of shape memory material could be controlled independently, or selectively actuated, to provide optical components with a finer granularity of movement. For instance, if the length of actuator 240 can be changed by an amount "1D" by changing the state of only one unit of shape memory material in actuator 240, then the length of actuator 240 can be changed by an amount "2D", by changing the state of two units of shape memory material, and so on. Likewise, in other examples provided in this disclosure such as the example of FIGS. 5A and 5B, individual units of shape memory material could be controlled independently to provide optical components with a finer granularity of movement.

Figure 3A:
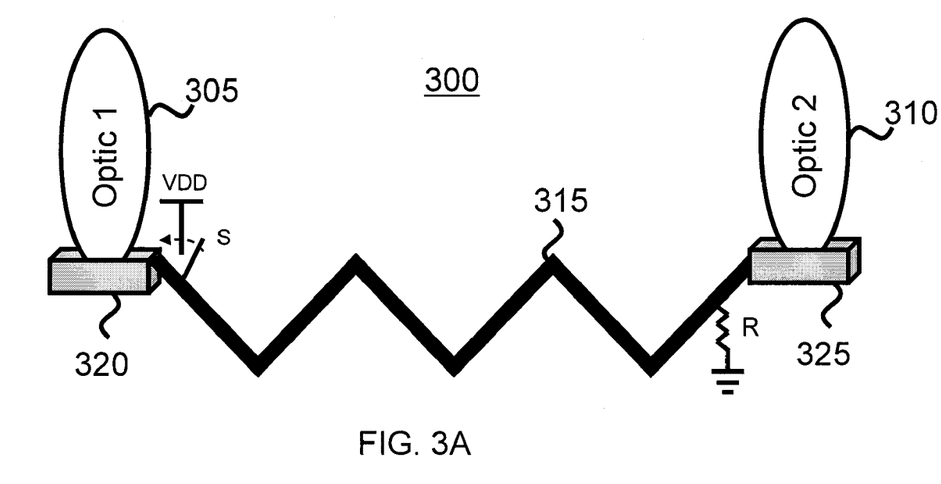
FIGS. 3A and 3B illustrate a zoom lens assembly controlled by an actuator comprising a shape memory material having a sawtooth shape.
Figure 3B:
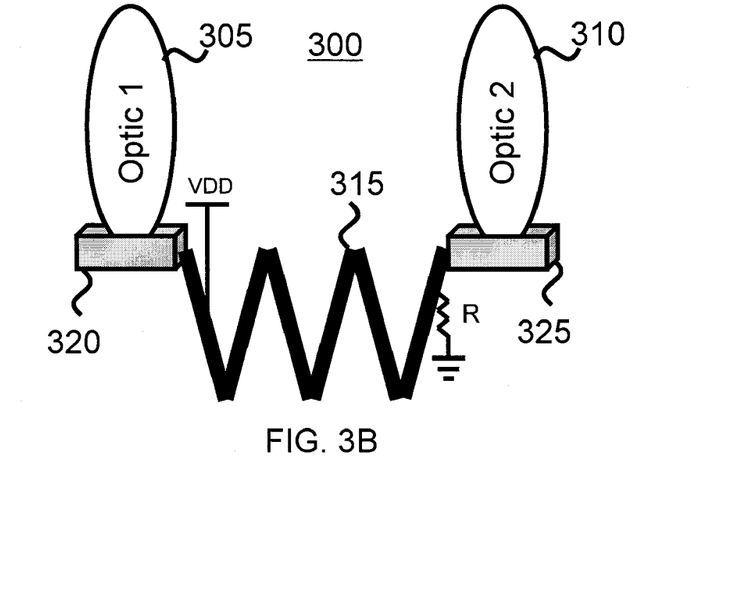
Figure 4A:
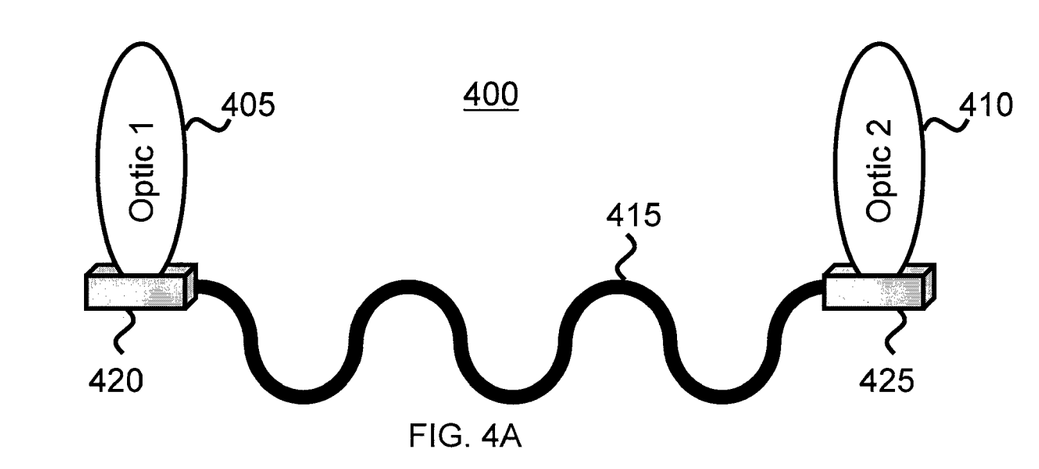
FIGS. 4A and 4B illustrate a zoom lens assembly controlled by an actuator comprising a shape memory material having a boustrophedonic shape.
Figure 4B:
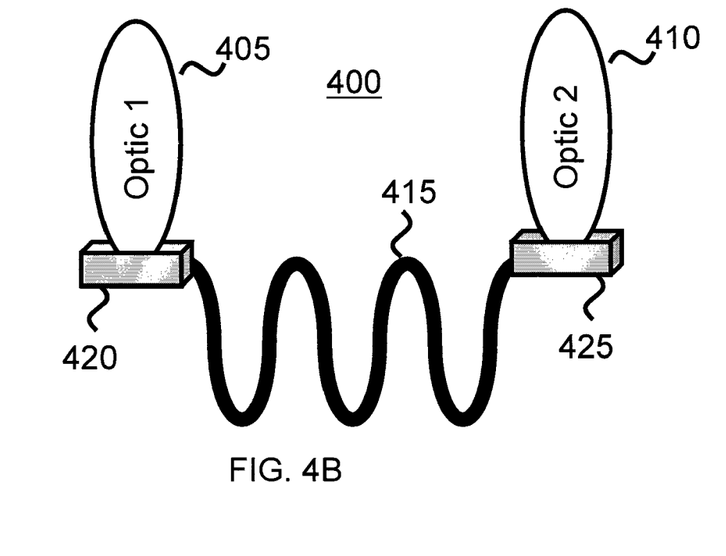
Figure 5A:
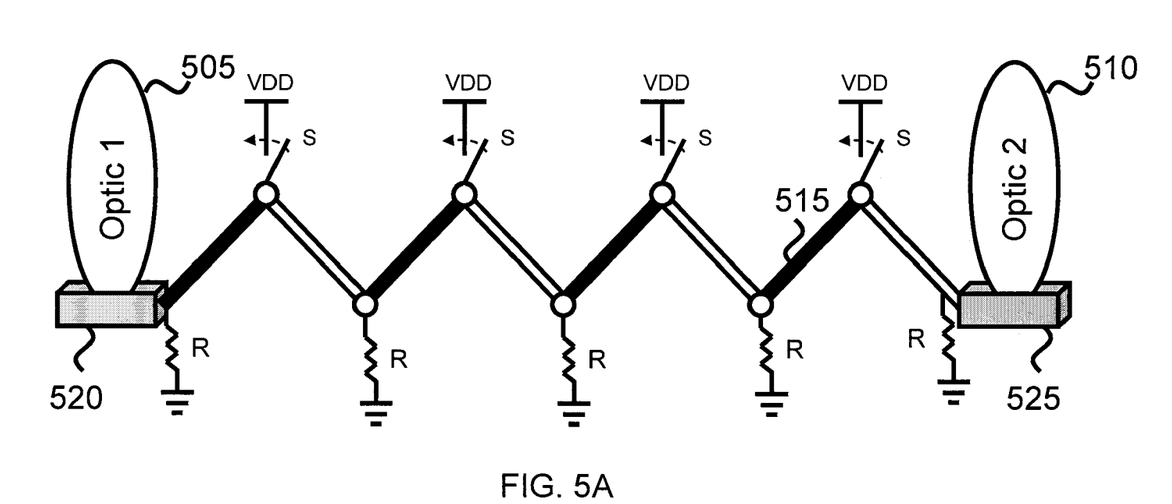
FIGS. 5A and 5B illustrate a zoom lens assembly controlled by an actuator comprising multiple independent units of shape memory material arranged in a sawtooth shape.
Figure 5B:
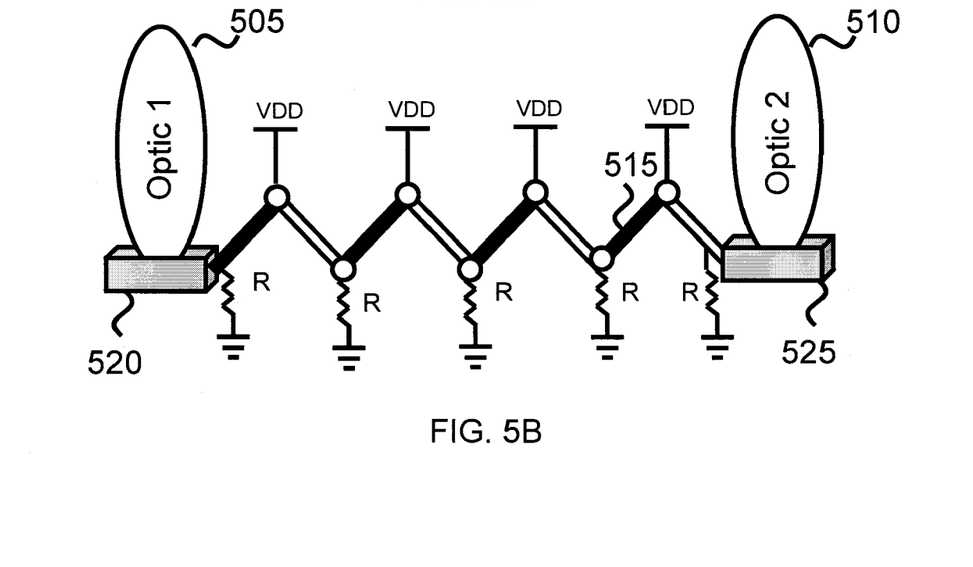

FIGS. 3 through 5 illustrate zoom lens assemblies that are similar to zoom lens assembly 200 shown in FIGS. 2A and 2B. In particular, the zoom lens assemblies illustrated in FIGS. 3 through 5 include similar optical components, mounts, and electrical features compared with FIGS. 2A and 2B. Moreover, the number, type, and arrangement of these components and associated control mechanisms can be modified in a variety of ways similar to those described above in relation to FIGS. 2A through 2D. Because the zoom lens assemblies of FIGS. 3 through 5 are similar to the zoom lens assemblies of FIGS. 2A and 2B, a detailed description of various features will be omitted from the following description of FIGS. 3 through 5 in order to avoid redundancy.

FIGS. 3A and 3B illustrate a zoom lens assembly 300 controlled by an actuator 315 comprising a shape memory material having a sawtooth shape. In FIG. 3A, the sawtooth shape has an extended configuration giving zoom lens assembly 300 a relatively large effective focal length, and in FIG. 3B, the sawtooth shape has a contracted configuration giving zoom lens assembly 300 a relatively small effective focal length. Actuator 315 is connected between mounts 320 and 325 in order to bring first and second optics 305 and 310 closer together when actuator 315 assumes the contracted configuration, and to move the optics further apart when actuator 315 assumes the extended configuration.

FIGS. 4A and 4B illustrate a zoom lens assembly 400 controlled by an actuator 415 comprising a shape memory material having a boustrophedonic "S", or sinusoidal shape. In FIG. 4A, the boustrophedonic "S" shape has an extended configuration giving zoom lens assembly 400 a relatively large effective focal length, and in FIG. 4B, the boustrophedonic "S" shape has a contracted configuration giving zoom lens assembly 400 a relatively small effective focal length. Actuator 415 is connected between mounts 420 and 425 in order to bring first and second optics 405 and 410 closer together when actuator 415 assumes the contracted configuration, and to move the optics further apart when actuator 415 assumes the extended configuration.

Figure 9A:
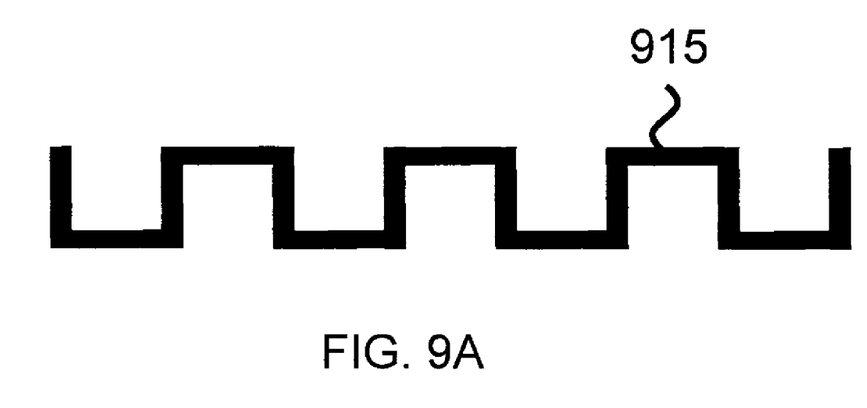
FIGS. 9A and 9B illustrate an actuator having a rectilinear shape.
Figure 9B:
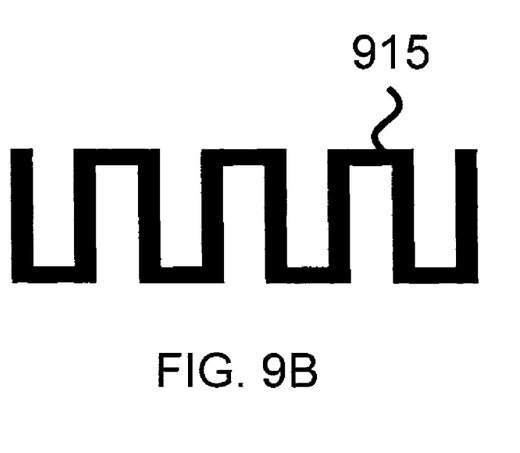

The term "boustrophedonic" refers generally to a shape having a back-and-forth pattern such as that illustrated in FIG. 4A and 4B. The concept of a boustrophedonic shape can be viewed to encompass a wide variety of back-and-forth shapes such as the sawtooth shape of actuator 315 shown in FIGS. 3A and 3B, the "S" shape of actuator 415, and rectilinear shapes such as the shape of an actuator 915 illustrated in expanded and contracted configurations in FIGS. 9A and 9B, respectively. In general, the boustrophedonic "S" shape of FIGS. 4A and 4B differs from other boustrophedonic shapes such as the sawtooth shape of FIGS. 3A and 3B in that other shapes may articulate most dramatically around intersections, or "hinge points", between adjoining linear sections, whereas the boustrophedonic shape of FIGS. 4A and 4B deforms in a more continuous manner throughout.

FIGS. 5A and 5B illustrate a zoom lens assembly 500 controlled by an actuator 515 comprising multiple independent units of shape memory material arranged in a sawtooth configuration. In FIG. 5A, the sawtooth shape has an extended configuration giving zoom lens assembly 500 a relatively large effective focal length, and in FIG. 5B, the sawtooth shape has a contracted configuration giving zoom lens assembly 500 a relatively small effective focal length. Actuator 515 is connected between mounts 520 and 525 in order to bring first and second optics 505 and 510 closer together when actuator 515 assumes the contracted configuration, and to move the optics further apart when actuator 515 assumes the extended configuration.

In contrast to actuator 315, which also has a sawtooth shape, actuator 515 comprises several units of shape memory material that deform independently of each other. One advantage of using independently deformable units in this way is that it allows the units to be controlled in parallel. For instance, in actuator 515, the simple electrical control system used to control actuator 315 of FIGS. 3A and 3B can be replaced by a simple electrical control system supplying a power and ground connection to respective ends of each independent unit of shape memory material, as illustrated in FIGS. 5A and 5B. By controlling the units of shape memory material in parallel, actuator 515 may be able to deform more rapidly and more efficiently than actuator 315 in the sawtooth shape of FIGS. 3A and 3B.

In the example zoom lens assemblies presented in FIGS. 2 through 5, actuators comprising shape memory materials are used to directly move corresponding optical components. In other words, in the examples of FIGS. 2 through 5, the deformation of the shape memory metals translates directly into movement of the corresponding optical components. However, in other examples, actuators comprising shape memory materials may be used to indirectly move corresponding optical components. For instance, the deformation of shape memory materials can be translated into the movement of optical components by using the shape memory materials to control mechanical components such a gear and clutch system, a small motor, and so forth.

Figure 6A:
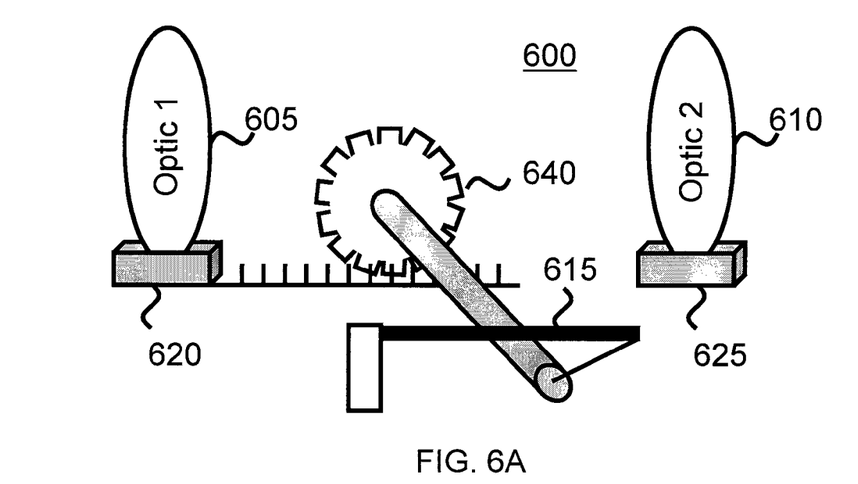
FIGS. 6A and 6B illustrate a zoom lens assembly controlled by an actuator comprising a shape memory material connected to a rack and pinion gear system.
Figure 6B:
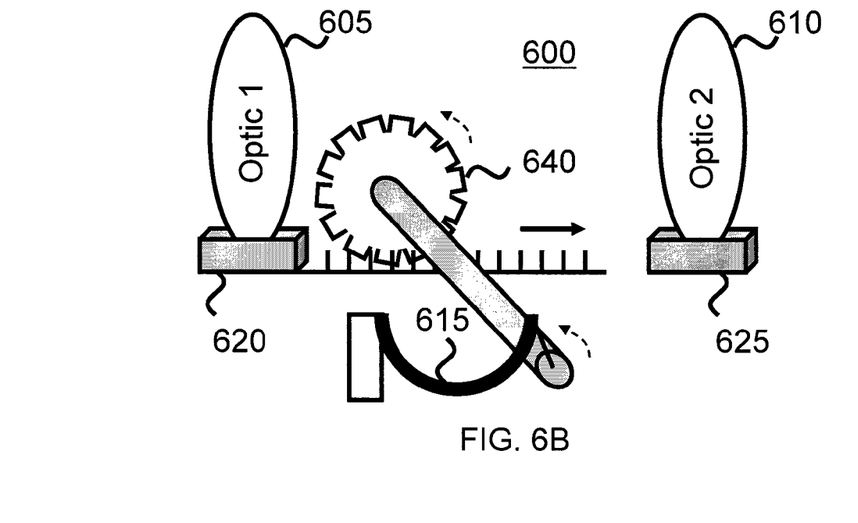

To illustrate the general concept of using a shape memory material to indirectly control the movement of optical components in a zoom lens assembly, FIGS. 6A and 6B show an example zoom lens assembly 600 using a shape memory material actuator 615 to indirectly control the movement of an optical component through a simple rack and pinion gear system. In FIG. 6A, actuator 615 has an extended configuration giving zoom lens assembly 600 a relatively large effective focal length, and in FIG. 6B, actuator 615 has a contracted configuration giving zoom lens assembly 600 a relatively small effective focal length. When actuator 615 changes from the extended configuration to the contracted configuration, it rotates a rod connected to a main gear 640 in the rack and pinion gear system. As a result, main gear 640 rotates in a direction indicated by a broken arrow in FIG. 6B to move a first optic 605 toward a second optic 610 as indicated by a solid arrow pointing to the right in FIG. 6B.

In each of the foregoing examples, a shape memory material provides the actuating force for moving one or more optical components in a zoom lens assembly. In general, the shape memory material may move the optical components either directly as illustrated by the examples of FIGS. 2 through 5, or indirectly as illustrated by the example of FIG. 6. In each of the illustrated examples, a shape memory material moves optical components relative to each other to perform zoom-in or zoom-out operations in a zoom lens assembly. However, in other examples, a shape memory material could move one or more optical components relative to a fixed object such as a projection plane or a light detector in order to perform zooming operations.

By comparison with conventional zoom lens assemblies, several examples presented in this disclosure provide improvements including increased reliability, increased power efficiency, increased speed, and increased accuracy. In addition, some of the examples provide zoom lens assemblies that are smaller than conventional zoom lens assemblies. In several of the examples, these benefits can be attributed to the use of shape memory materials acting as actuator components.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. Further any specific numbers noted herein are only examples: alternative implementations may employ differing values or ranges.

The teachings of the invention provided herein can be applied to other systems, not necessarily those described above. Additionally, the elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms. Accordingly, the inventors reserve the right to add additional claims after filing the application to pursue such additional claim forms for other aspects of the invention.

I claim:

1. A zoom lens assembly, comprising:
   first and second optical components having a common optical axis; and
   an actuator comprising a shape memory ceramic, wherein the actuator is adapted to move the first and second optical components relative to one another in accordance with a geometric deformation of the shape memory ceramic from a first stable geometrical configuration to a second stable geometrical configuration, and wherein one or both of the first and second configurations is a non-straight configuration, and wherein the actuator indirectly moves the first and second optical components relative to each other by initiating movement of one or more gear components.

2. The zoom lens assembly of claim 1, wherein the first and second optical components are used to manipulate optical properties of a light beam in a bar code scanner.

3. The zoom lens assembly of claim 1, wherein the shape memory ceramic is arranged in multiple of layers interspersed with a flexible polymer material.

4. The zoom lens assembly of claim 1, wherein the first and second optical components move relative to each other by changing a distance between the first and second optical components.

5. The zoom lens assembly of claim 1, wherein the shape memory ceramic is formed as a mesh.

6. A method of controlling a zoom lens assembly comprising first and second optical components having a common optical axis, the method comprising:
   moving the first and second optical components relative to each other by controlling an actuator comprising a shape memory material to geometrically deform the shape memory material from a first stable geometric state to a second stable geometric state, wherein the first and second stable geometric states can each be maintained without continually applying energy to the shape memory material and,
      wherein the first or second geometric state has a bent shape, a boustrophedonic shape, boustrophedonic "S" shape, or a sawtooth shape; and,
   scanning a bar code based at least in part on the moving of the first and second optical components relative to each other.

7. The method of claim 6, wherein moving the first and second optical components relative to each other changes a distance between the first and second optical components.

8. The method of claim 6, wherein controlling the actuator comprises applying an electrical field to the shape memory material.

9. The method of claim 6, wherein controlling the actuator comprises applying an electrical field to the shape memory material, and wherein applying the electrical field to the shape memory material comprises running a current through the shape memory material.

10. A method of controlling a zoom lens assembly comprising first and second optical components having a common optical axis, the method comprising:
    moving the first and second optical components relative to each other by controlling an actuator comprising a shape memory material to geometrically deform the shape memory material from a first stable geometric state to a second stable geometric state, wherein the first and second stable geometric states can each be maintained without continually applying energy to the shape memory material, and wherein the geometric deformation of the shape memory material indirectly modifies the distance between the first and second optical components by initiating movement of one or more gears.

11. The method of claim 10, wherein the first or second geometric state has a bent shape.

12. The method of claim 10, wherein the first or second geometric state has a sawtooth shape.

13. The method of claim 10, wherein the first or second geometric state has a boustrophedonic shape.

14. The method of claim 10, wherein the first and second optical components are used to manipulate optical properties of a light beam in a bar code scanner.

15. The method of claim 10, wherein the shape memory material comprises a shape memory ceramic arranged in multiple layers interspersed with a flexible polymer material.

16. The method of claim 10, wherein the shape memory material is formed as a mesh.

* * * * *